United States Patent [19]

Ljungström

[11] 4,325,674

[45] Apr. 20, 1982

[54] WIND TURBINE OF CROSS-FLOW TYPE

[76] Inventor: Olle Ljungström, Sälgstigen 12, S-181 62 Lidingö, Sverige, Sweden

[21] Appl. No.: 82,051

[22] Filed: Oct. 5, 1979

[30] Foreign Application Priority Data

Oct. 6, 1978 [SE] Sweden ............................. 7810503

[51] Int. Cl.$^3$ .............................................. F03D 3/06
[52] U.S. Cl. .................................... 416/19; 416/203; 416/227 A; 416/139
[58] Field of Search ..................... 416/19, 139 A, 119, 416/227, DIG. 8, 203

[56] References Cited

U.S. PATENT DOCUMENTS

| 332,309 | 12/1885 | Vogelsang | 416/203 |
| 1,636,434 | 7/1927 | Pinaud | 416/19 X |
| 1,786,057 | 12/1930 | Fales | 416/19 |
| 1,802,094 | 4/1931 | Stuart | 416/19 X |
| 2,371,160 | 3/1945 | Everts | 416/19 |
| 2,471,687 | 5/1949 | Holmes | 416/19 |
| 2,475,318 | 7/1949 | Gluhareff | 416/19 |
| 2,663,372 | 12/1953 | Sikorsky | 416/19 |
| 3,372,758 | 3/1968 | Jenney | 416/19 X |
| 3,592,559 | 7/1971 | Ward | 416/121 R |
| 3,918,839 | 11/1975 | Blackwell et al. | 416/203 X |
| 4,264,279 | 4/1981 | Dereng | 416/227 A |

FOREIGN PATENT DOCUMENTS

| 158861 | 7/1952 | Australia | 416/11 |
| 121755 | 7/1901 | Fed. Rep. of Germany | 416/119 |
| 963229 | 5/1957 | Fed. Rep. of Germany | 416/19 |
| 1076588 | 2/1960 | Fed. Rep. of Germany | 416/19 |
| 2739297 | 3/1978 | Fed. Rep. of Germany | 416/132 B |
| 968710 | 12/1950 | France | 416/19 |
| 1004455 | 3/1952 | France | 416/203 |
| 2298707 | 8/1976 | France | 416/227 A |
| 124935 | 4/1919 | United Kingdom | 416/19 |
| 462037 | 3/1937 | United Kingdom | 416/19 |

*Primary Examiner*—Everette A. Powell, Jr.
*Attorney, Agent, or Firm*—Eric Y. Munson

[57] ABSTRACT

Wind turbine of cross-flow type with curved or in sections straight vanes (1,2,9). Two vanes or sets of blades are formed in planes parallel to the rotor axis (3) and with the blade planes disposed approximately perpendicularly to one another.

4 Claims, 17 Drawing Figures

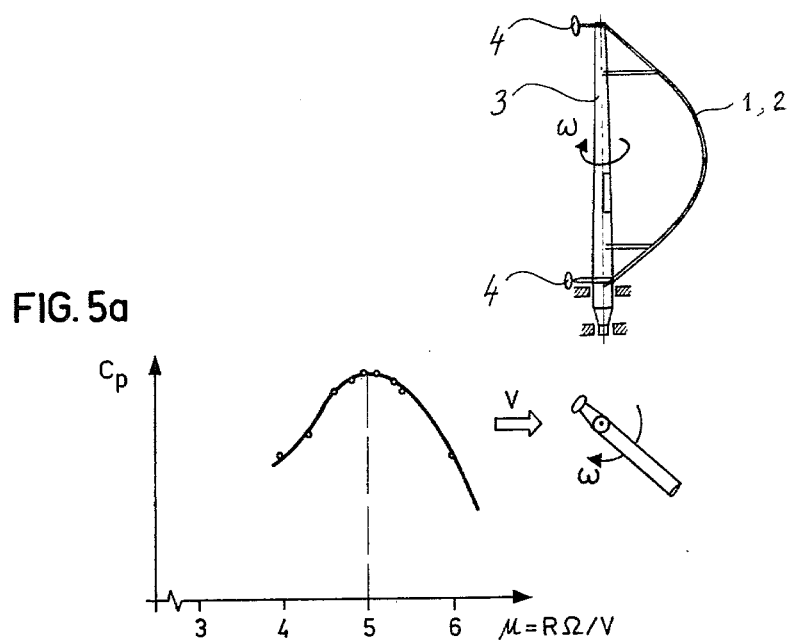
FIG. 5a
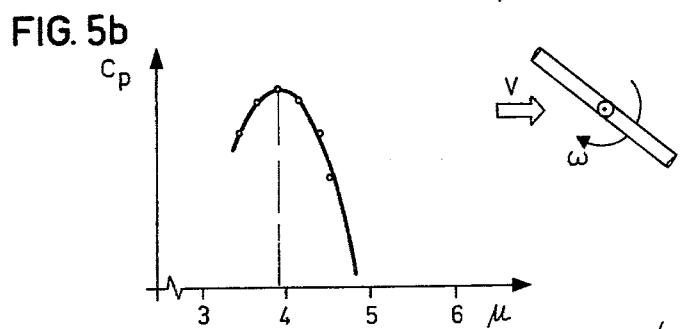
FIG. 5b
FIG. 5c
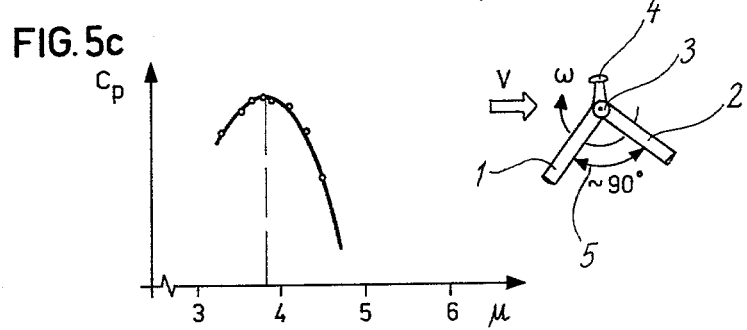

WIND TURBINE OF CROSS-FLOW TYPE

The present invention relates to a wind turbine of the cross-flow type and the object of the invention is to reduce the variations in load acting on the tower of the wind turbine in comparison with conventional turbines of the named kind. This and further objects are obtained according to the invention by the wind turbine having been imparted the characteristic features stated in the subsequent claims.

The invention will be described nearer below in connection with the accompanying drawings.

FIGS. 5a, 5b and 5c show in outline diagrams of the effect coefficient as related to the number of revolutions, FIG. 5a showing side view and a top view of a single-vaned turbine of the Darrieus type and a corresponding diagram, FIG. 5b a top view of a two-vaned turbine of the Darrieus type and FIG. 5c a top view of a two-vaned turbine constructed according to the invention and a corresponding diagram.

Figure 6:
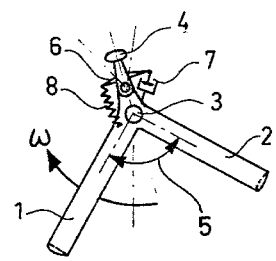

FIG. 6 shows a top view of a turbine according to the invention which is balanced by means of balance weights.

Figure 7A:
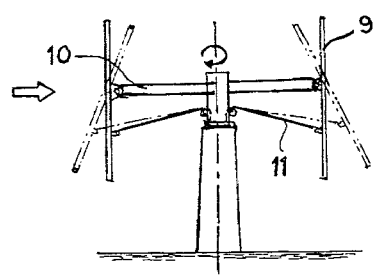
Figure 7B:
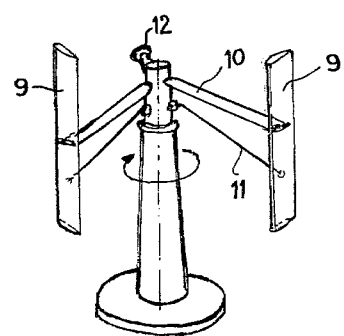
Figure 7C:
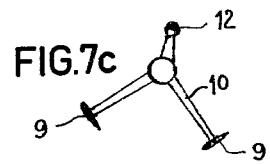

FIG. 7a shows a side view of a cross-flow turbine of known type, namely a two-vaned, vertical-axis turbine with straight vanes according to Musgrove, Reading University, while the FIGS. 7b and 7c show a side view in perspective and a top view respectively of a modification of the same in which the L-vane arrangement according to this invention is provided.

In all figures $F_x$ and $F_y$ denote the force in the direction of, respectively, the x-axis and y-axis, $F_{res}$ the resulting force, $\theta$ the angle between the resulting force and the x-axis, $\phi$ the angle between turbine vane and the x-axis, V the direction of the wind, $C_p$ the number of revolutions and $\mu$ the effect coefficient.

Figure 1:
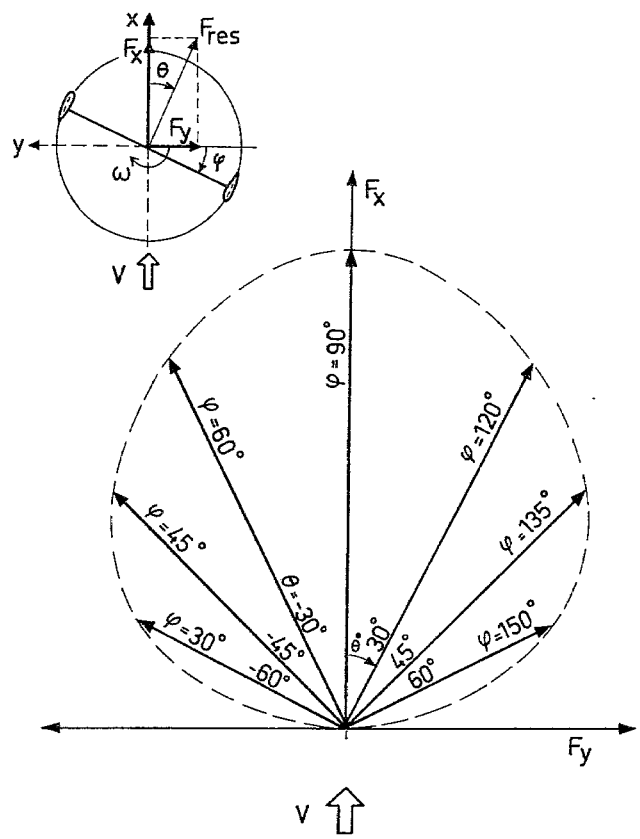
FIG. 1 shows a top view of the distribution of the wind forces in a conventional two-vaned turbine of the cross-flow type such as a Darrieus-type turbine, and shows also in outline a diagram of the distribution of forces.
Figure 2A:
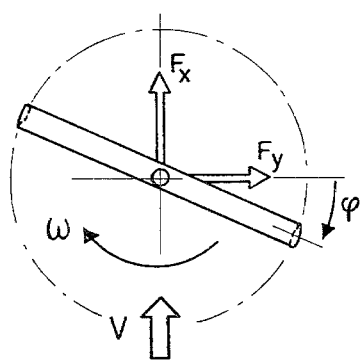
FIGS. 2a, 2b and 2c show the wind forces acting on a two-vaned Darrieus-type turbine of conventional construction with an angle of 180° between the vanes, FIG. 2a being a top view of the turbine, FIG. 2b an oscillogram of the distribution of forces and FIG. 2c an oscillogram of the force as a function of time.
Figure 2B:
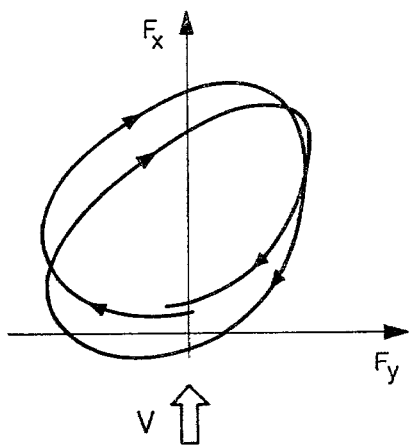
Figure 2C:
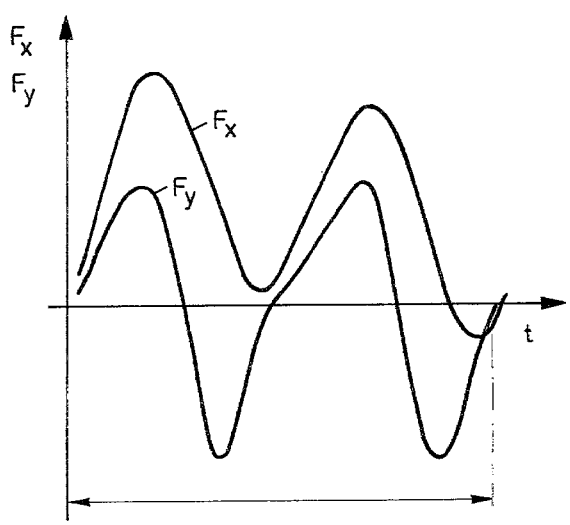
Figure 3A:
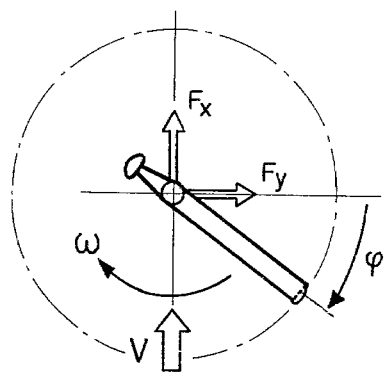
FIGS. 3a, 3b and 3c show the wind forces acting on a single-vaned turbine of the Darrieus type, FIG. 3a being a top view of the turbine, FIG. 3b an oscillogram of the forces, and FIG. 3c an oscillogram of the force in relationship to time.
Figure 3B:
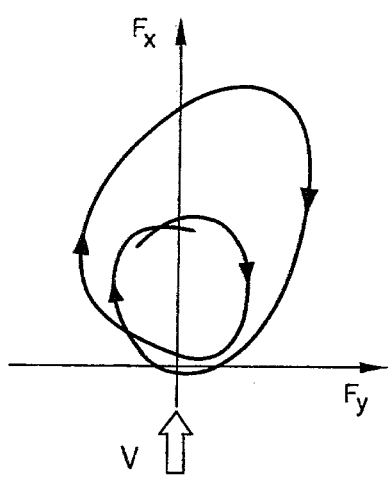
Figure 3C:
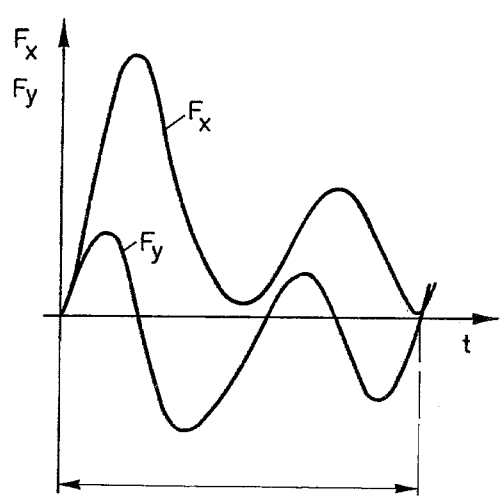

As is evident from the FIGS. 1 and 2, which show distribution of forces and wind forces acting on a conventional two-vaned cross-flow turbine of Darrieus-type with an angle $\lambda$ of 180° between the turbine vanes great variations in load occur under operation of the turbine, which variations in load constitute a severe problem in the operation of turbines of this type. This holds true also for a single-vaned turbine of Darrieus type, as will be understood from the FIGS. 3a–3c.

Figure 4A:
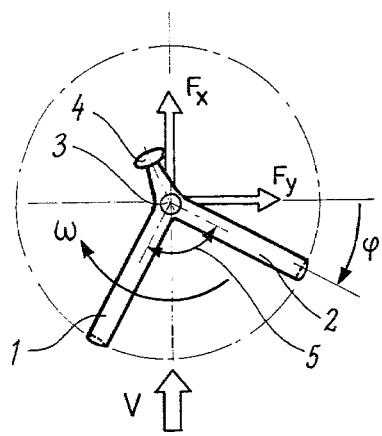
FIGS. 4a, 4b and 4c show the wind forces acting on a two-vaned cross-flow turbine of the Darrieus type modified according to the invention with an angle of 90° between the vanes, FIG. 4a being a top view of the turbine, FIG. 4b an oscillogram of the distribution of forces and FIG. 4c an oscillogram of the force in relationship to time.
Figure 4B:
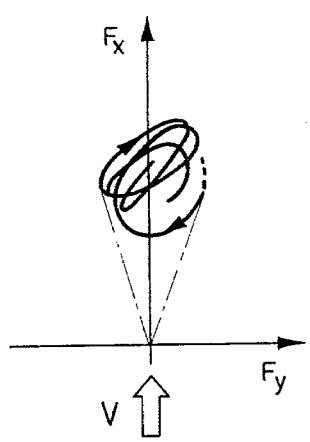
Figure 4C:
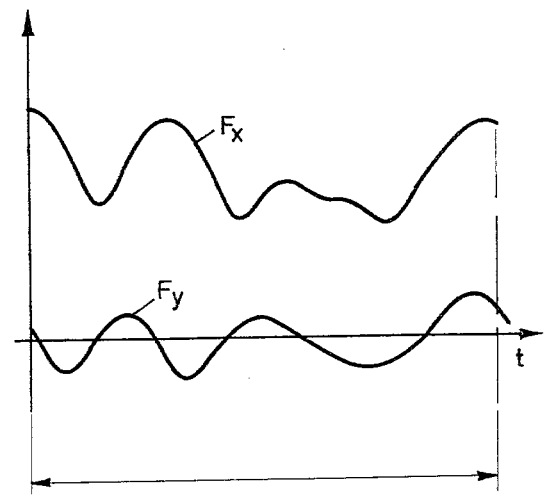

According to the invention, there is, therefore, provided a wind turbine of the cross-flow type, such as a Darrieus-type turbine, for example, in which the curved or in sections straight vanes 1, 2 are formed with two blades or sets of blades in planes which are parallel with the rotor shaft 3 and with the individual blade planes disposed perpendicularly or almost perpendicularly to one another as will be seen from FIG. 4a. As is evident from FIGS. 4b and 4c, the result will be that the variations in load acting on the tower are reduced considerably in comparison with a conventional Darrieus-type turbine with one or two vanes, as has been shown in FIGS. 2–3. In tests it has been evidenced that the load on the turbine tower becomes almost constant in magnitude and direction and that the maximum load is only slightly more than one half of the maximum load on a conventional two-vaned Darrieus-type turbine. Even a three-bladed Darrieus-type turbine is subjected to greater load variations than a two-vaned turbine which has the vanes arranged according to the present invention.

The invention can be applied to all turbines of the cross-current type, both vertical-axis turbines and horizontal-axis ones.

It is also obvious that the invention, though described hereinbefore with reference to turbines of the Darrieus-type, can be applied also to similar wind turbines of cross-flow type following some other definition.

The FIGS. 5a–5c show a further comparison between the two known turbine types and the turbine according to the invention with the effect coefficient set out in relation to the number of revolutions.

The two sets of blades 1, 2 in the turbine according to the invention can also be mass-balanced about the turbine axis 3 by means of balance weights 4, as is illustrated in FIG. 6. These balance weights 4 may also be two or more in number. The balance weights 4 may in this connection be suspended from bearings 6 in a self-aligning manner with little radial spacing from the rotor axis 3 and may as an alternative be equipped in any known manners with oscillation-modulating damping devices 7 and spring members 8 for return to neutral position as is also shown in FIG. 6. This arrangement can reduce vibration loads generated in the turbine tower. The angle 5 between the sets of vanes 1 and 2 may also be devised adjustable in many known manners either when the turbine is stopped or is in operation. In the latter case the adjustment of the angle may be devised with angular variation adapted cyclically to the direction of the wind as well as adjustable to the wind velocity with regard to amplitude and phase angle.

The FIG. 7a shows the Musgrove-turbine with two vertical straight vanes 9 pivotally mounted on a cross-arm 10 so that they during rotation with the aid of centrifugal forces are brought in an inclined position controlled by means of an extendable bracing 11.

The FIGS. 7b and 7c show the Musgrove-turbine provided with the L-vane arrangement according to the invention that is with the blades or vanes 9 mounted on supporting arms 10 with an angle of about 90° between them together with a counter weight 12 on a separate arm in the bisectrix of the supporting arms 10. The vanes 9 may be pivotable as shown in FIG. 7a or fixed.

Although the invention has been described hereinbefore in connection with specific embodiments, it is clear that it may be varied within the scope of the subsequent claims.

I claim:

1. In a wind turbine of the cross flow type including a rotor shaft and vanes mounted to said rotor shaft, the improvement comprising:

only two vanes being mounted to said rotor shaft, each of said only two vanes being mounted to said rotor shaft so that each vane extends from said rotor shaft in a direction that is substantially perpendicular to the direction from which the other vane extends from said rotor shaft.

2. The wind turbine as claimed in claim 1 further including means mounted to said rotor shaft for balancing said two vanes mounted thereto.

3. The wind turbine as claimed in claim 2 wherein said means for balancing includes at least one balance weight,
said balance weight being suspended from bearings coupled to said rotor shaft, said balance weight being spaced apart from the axis of said rotor shaft in a radial direction.

4. The wind turbine as claimed in claim 3 wherein said means for balancing further includes a vibration-modulating damping device coupled to said balance weight and spring means coupled to said balance weight and biased towards the neutral position of said balance weight.

* * * * *